United States Patent

Makino et al.

[11] Patent Number: 6,162,594
[45] Date of Patent: *Dec. 19, 2000

[54] PHOTOGRAPHIC ROLL FILM

[75] Inventors: Teruyoshi Makino; Jun Inose; Ayako Okubo; Ryuji Uemura, all of Minami-ashigara, Japan

[73] Assignee: Fuji Photo Film Co., Ltd., Kanagawa, Japan

[*] Notice: This patent is subject to a terminal disclaimer.

[21] Appl. No.: 09/482,106

[22] Filed: Jan. 13, 2000

Related U.S. Application Data

[62] Division of application No. 09/039,403, Mar. 16, 1998, Pat. No. 6,022,678.

[30] Foreign Application Priority Data

| Mar. 14, 1997 | [JP] | Japan | 9-081938 |
| Mar. 27, 1997 | [JP] | Japan | 9-075553 |
| Mar. 28, 1997 | [JP] | Japan | 9-076892 |
| May 15, 1997 | [JP] | Japan | 9-125877 |

[51] Int. Cl.[7] .................................................. G03C 3/00
[52] U.S. Cl. .......................................................... 430/501
[58] Field of Search ........................ 430/501; 242/348.4; 396/512

[56] References Cited

U.S. PATENT DOCUMENTS

| 5,258,789 | 11/1993 | Labaziewicz | 354/21 |
| 5,934,592 | 8/1999 | Makino | 242/348.4 |
| 6,022,678 | 2/2000 | Makino | 430/501 |

FOREIGN PATENT DOCUMENTS

0763768 A2  3/1997  European Pat. Off. .

*Primary Examiner*—Mark F. Huff
*Assistant Examiner*—Amanda C. Walke
*Attorney, Agent, or Firm*—Sughrue, Mion, Zinn, Macpeak & Seas, PLLC

[57] ABSTRACT

A photographic roll film such as Brownie film is placed on a backing paper or a leader paper. The roll film is joined at its one or both ends to the backing paper or leader paper with a jointing tape, which has on its surface a bar code composed of light absorbing bars and light reflecting spaces. The light absorbing bars show a reflectance of less than 30% and a glossiness of less than 20%, and the light reflecting spaces show a reflectance of more than 50% and a glossiness of less than 35%. Further, the total of the glossiness of light absorbing bars and the glossiness of light reflecting spaces is less than 50%. The reflectance and glossiness both are determined utilizing a light in a wavelength region other than a light sensitive wavelength region of the roll film.

7 Claims, 7 Drawing Sheets

PHOTOGRAPHIC ROLL FILM

This is a divisional of application Ser. No. 09/039,403 filed Mar. 16, 1998, now U.S. Pat. No. 6,022,678 the disclosure of which is incorporated herein by reference.

FIELD OF THE INVENTION

The present invention relates to a photographic roll film such as Brownie film. Particularly, the invention relates to a photographic roll film which is placed on a light-shielding backing paper or a light-shielding leader paper and joined at its one end or both ends to the backing paper or leader paper with a jointing tape.

BACKGROUND OF THE INVENTION

A photographic roll film generally called a Brownie film is a longitudinal film which has a relatively large width and is wound around a cylinder core (generally referred to as a "spool") utilizing a light-shielding backing paper or leader paper. The photographic roll film of the Brownie type is generally not encased in a magazine (or patrone), which is in contrast to a photographic film of 135 type (which is generally referred to as "35 mm film") which is encased in a magazine or patrone. Brownie films are classified into two types, that is, a relatively short roll film named "120 size film" and a relatively long roll film named "220 size film". In the 120 size film, the photographic roll film is placed on and supported by a shielding paper (backing paper). In the 220 size film, one leading paper having a light shielding property is attached to each end of the photographic roll film under the condition that a certain overlapping area is formed between the roll film and the leader paper. The backing paper and leading paper are joined to the photographic roll film using a separately prepared jointing tape.

Brownie film is advantageous for producing a photographic image of a larger size, and recently a demand for Brownie film has gradually increased. However, complicated procedures for installing a photographic roll film of Brownie type form a barrier to the spread of use of Brownie films. In contrast, a widely employed photographic image-forming system using a 35 mm film and a camera for the 35 mm film utilizes a magazine which has on its outer surface an electrically detectable code which transmits information on the photographic film to a camera when the film is installed into the camera. The information is for the type of photographic film such as monochrome, negative color, or positive color, the photographic sensitivity of the film, the length of the film, etc. When the photographic film is installed into a camera, an electric code detector device equipped with the camera works to read the information of the installed photographic film from the code on the surface of the magazine and automatically sets the operational conditions of the camera according to the information contained in the code. Therefore, there is no need for setting complicated operational conditions in the camera for those who want to take photographic pictures. For a photographic image producing system using Brownie films and a camera therefor, no magazine system is provided. Accordingly, those who want to take photographic pictures using Brownie film themselves should set all information relating to the photographic film in the camera.

In order to obviate the complicated procedures in the use of Brownie type films, the present inventors have already invented a new system which comprises a photographic roll film having a jointing tape on which a bar code containing information for the photographic film is printed and a camera equipped with an optical bar code detector device. The bar code detector automatically reads the bar code and transmit the information to the camera for automatically setting the operational conditions in the camera.

The above-mentioned new photographic system utilizing a Brownie film having a jointing tape on which a bar code is printed is very advantageous because a photographer is not required to input by himself into the camera the information relative to the photographic film by the complicated procedures. Further, the new system is advantageous from the point of view that erroneous input is avoided.

In the course of improvement studies for the new photographic system, the inventors have noted that reading errors sometimes happen. In more detail, in the new photographic system comprising a photographic roll film using a jointing tape on which a bar code is printed and a camera equipped with an optical bar code detector device, the bar code detector device sometimes fails to read the information from the bar code in the course of repeated procedures.

When such reading errors happen, a photographer can manually input the information relating to the roll film into the camera. However, as described above, the manual input is a complicated and troublesome procedure. Therefore, the reading error should be avoided.

Accordingly, the inventors have further continued to study the cause of the reading error and the measures for obviating the reading error. As a result, the inventor have found that the reading error is caused by deformation of the jointing tape and the accompanying deformation of the bar code. In more detail, the jointing tape is fixed on the edge of the roll film to cover the end portion of the roll film and the backing paper or leader paper. The photographic roll film generally has a thickness of approximately 100 $\mu$m. Therefore, the photographic roll film and the backing paper or leader paper form certain differences in level at the edge line of the roll film. Accordingly, the jointing tape placed on the edge line of the roll film is liable to show deformation in the thickness direction. Moreover, since the Brownie film is tightly wound around the spool, the deformation of the jointing tape is amplified in the course of storage of the film.

The optical bar code detector (i.e., bar code reader) functions to apply a detecting light on the surface of the bar code and detect a pattern of scattered light reflection from the bar code. The detected pattern is then processed in the detector to output the data having been contained in the bar code.

According to the studies of the inventors, the deformation of the jointing tape is apt to decrease the amount of the scattered light reflection which should be collected by the detector for analyzing the operational data or to give a modified bar code pattern to the bar code detector. These problems sometimes cause the detection errors.

SUMMARY OF THE INVENTION

The present invention has an object to provide a photographic roll film such as Brownie film which is easily set into a camera and whose photographic or operational data can be automatically transmitted to the camera so that no or almost no manual input of these data into the camera is required.

Specifically, the invention provides a photographic roll film from which its photographic and operational data can be automatically transmitted into a camera with high reliability.

The invention resides in a photographic roll film placed on a light-shielding backing paper or a light-shielding leader paper, said roll film being joined at its one end or both ends to the backing paper or leader paper with a jointing tape, in which the jointing tape has on its surface a bar code comprising light absorbing bars and light reflecting spaces, the light absorbing bars show a reflectance of less than 30% and a glossiness of less than 20%, the light reflecting spaces show a reflectance of more than 50% and a glossiness of less than 35%, and the total of the glossiness of light absorbing bars and the glossiness of light reflecting spaces is less than 50%, the reflectance and glossiness both being for a light in a wavelength region other than a light sensitive wavelength region of the roll film.

The reflectance defined in the invention can be determined at a wavelength of 900±50 nm utilizing a commercially available spectrophotometer. The light sensitive wavelength region of a conventional Brownie film is 400 to 700 nm.

The glossiness is a 60° specular gloss or a 60° specular reflection which is defined in JIS (Japanese Industrial Standard) Z8741 and is determined by means of a commercially available glossmeter.

In the photographic roll film of the invention, the reflectance and glossiness of the light reflecting spaces preferably are more than 60% and less than 30% (more preferably less than 20%), respectively. The reflectance and glossiness of the light absorbing bars preferably are less than 10% and less than 18%, respectively. The total of the glossiness of light absorbing bars and the glossiness of light reflecting spaces preferably is less than 40%. The light absorbing bars preferably have a matted surface.

In a preferred feature of the photographic roll film of the invention, the jointing tape has in a position along the bar code a reference area for correcting a value detected on the bar code, the reference area showing a reflectance and a glossiness essentially equivalent to those of the light reflecting spaces. Also preferred is that the jointing tape has in a position along the bar code a reference area for correcting a value detected on the bar code, said reference area comprising a light absorbing area and a light reflecting area in which the light absorbing area shows a reflectance and a glossiness essentially equivalent to those of the light absorbing bars and the light reflecting area shows a reflectance and a glossiness essentially equivalent to those of the light reflecting space.

The light absorbing bars are preferably formed of a hot melt ink composition comprising a wax component having a rate of penetration of less than 25 at 25° C. and a melting point of higher than 65° C., a resin component being compatible with the wax component, and a colorant. More specifically, the light absorbing bars can be formed of a hot melt ink composition comprising a wax component having a rate of penetration of less than 25 at 25° C. and a melting point of higher than 65° C., an ethylene-vinyl acetate copolymer, a denatured aromatic terpene, and a colorant.

In another preferred feature of the invention, the jointing tape has on its surface a number for identifying the roll film in addition to the bar code.

The jointing tape preferably comprises a substrate sheet having a Gurley stiffness in the range of 80 to 150 mgf. The Gurley stiffness is defined in J. TAPPI, paper-pulp testing method No. 40, and is determined by placing a test specimen vertically on a fixed base and bending its free end at a constant rate to measure a bending moment in terms of "mgf". The substrate sheet preferably is a synthetic paper sheet made of a synthetic resin which is selected from the group consisting of polyolefins (e.g., polyethylene and polypropylene), polyesters (e.g., polyethylene terephthalate and polyethylene naphthalate), and polystyrene. Further, the substrate sheet preferably has a surface smoothness of more than 500 sec, which is determined according to JIS P8119-94.

In a further preferred feature, the jointing tape has on at least one side means for assisting rupture of the tape when a shearing force is applied to the tape in a direction traversing the roll film. More specifically, the jointing tape has on at least one side one or more slits that extend in a direction traversing the roll film and assist rupture of the tape when a shearing force is applied to the tape in a direction traversing the roll film.

DETAILED DESCRIPTION OF THE INVENTION

The photographic roll film of the invention is placed on a backing paper or a leader paper and the roll film is joined at its one end or both ends to the backing paper or leader paper with a jointing tape.

There is no specific limitation with respect to types of the roll film. The conventionally employed Brownie type films such as a 120 type film and a 220 type film can be employed for the photographic roll film of the invention. The photographic roll film preferably comprises a polyethylene naphthalate substrate film. The backing paper or leader paper can have a hole or any processed portion at its one end or both ends which are utilized for easy and reliable engagement with a spool around which the photographic roll film is wound.

Figure 1:
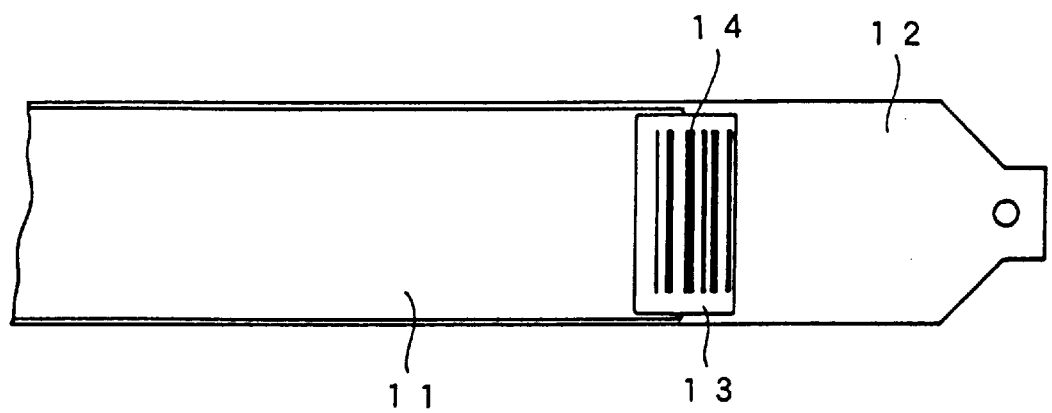
FIG. 1 illustrates a top plan view of a photographic roll film according to the invention.
Figure 2:
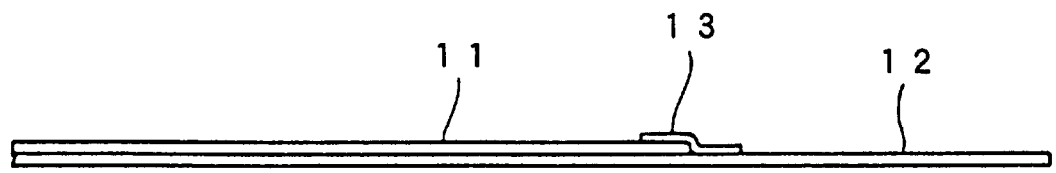
FIG. 2 illustrates a front view of the photographic roll film of FIG. 1.

A representative constitution of the photographic roll film of the invention is illustrated in FIG. 1 (top plan view) and FIG. 2 (front view) on the attached drawings.

The photographic roll film of the present invention comprises a longitudinal or continuous photographic film 11 and a light shielding backing paper 12. On one end of the backing paper, an opening or hole is formed for easy and stable engagement with a spool. One end of the photographic film 11 is joined onto the surface of the backing paper 12 by means of a jointing tape 13. On the jointing tape 13, a bar code having specific optical characteristics 14 is placed. The bar code 14 can be directly printed on the surface of the jointing tape 13 using an aqueous ink material or a hot melt ink material. The bar code 14 can be once printed on an appropriate label and then the bar code printed label can be attached onto the surface of the jointing tape 13.

The bar code is composed of a set of light absorbing bars and a set of light reflecting spaces which correspond to the spaces formed by adjoining light-absorbing bars. The light-absorbing bars are generally formed of a black ink.

The light-reflecting space generally is formed on a light reflecting substrate sheet. The light reflecting substrate sheet is selected from known materials such as a wood free paper sheet, a coated paper sheet, and an opaque paper, in consideration of their light reflectance and glossiness. The light-reflecting space should show a high reflectance and a low glossiness.

The light reflecting substrate sheet preferably has a Gurley stiffness in the range of 80 to 150 mgf. The Gurley stiffness of 80 to 150 mgf is larger than that of the jointing tape of the conventionally employed Brownie film, that is, a Gurley stiffness of 30 to 60 mgf.

The light reflecting substrate sheet preferably has a surface smoothness of more than 500 sec., preferably 500 sec. to 1,500 sec., which is determined by a test method defined in JIS P8119-94.

A light reflecting substrate having the preferred Gurley stiffness and surface smoothness can be composed of a synthetic paper sheet. The synthetic paper sheet can be formed of a synthetic resin such as polyethylene, polypropylene, polyethylene terephthalate, polyethylene naphthalate, or polystyrene. The synthetic paper sheet can be coated with a resin layer which may contain a white pigment.

The light absorbing bars of the bar code should show a low light reflection as that of the bars of the conventional bar code. The light absorbing bar of the bar code placed on the jointing tape of the invention further has a very low glossiness in addition to the low light reflection. The very low glossiness of the light absorbing bar can be attained, for instance, by making the jointing tape to have a matted surface. The surface matted light absorbing bar can be produced, for instance, by forming a bar code of hot melt ink on a separately prepared matted sheet (i.e., bar code transfer sheet) and then transferring the bar code of hot melt ink onto the jointing tape by combining the bar code transfer sheet and the jointing tape to form a laminate and applying heat to the laminate.

The bar code transfer sheet can comprise a film of polyester, polycarbonate, triacetyl cellulose, polyamide, or regenerated cellulose, or a chemically processed paper sheet such as a glassine paper sheet or a condenser paper sheet. These films and paper sheets preferably have a thickness of 2 to 30 μm. The matted surface can be formed by sand blasting or solution corrosion, and preferably has a Bekk smoothness of less than 1,000 sec. The matted surface can be also formed by placing a mat layer on the film or paper sheet. The mat layer can comprise a binder and an inorganic or organic white pigment such as titanium dioxide (i.e., white carbon), silica, calcium carbonate, a cellulose fiber, a urea resin powder, or a polymer beads. The bar code transfer sheet preferably has a back layer which functions as a stick-preventing layer. The stick-preventing layer can comprise a fatty acid lubricant or a silicone resin.

The hot melt ink comprises a heat fusible or heat plastic binder and a colorant (e.g., carbon black or other pigments and dyes). If desired, a non-colored pigment, plasticizer, lubricant, or other additive can be added. Examples of the heat plastic binder include waxes such as carnauba wax, paraffin wax, oxidized wax, montan wax, microcrystalline wax, oxidized polyethylene, partially saponified ester wax, and thermoplastic resins such as styrene-butadiene copolymer, ethylene-vinyl acetate copolymer, vinyl chloride-vinyl acetate copolymer, polybutyral resin, polyester resin, ethyl cellulose and natural rubber.

The hot melt ink composition preferably contains a colorant (particularly, agranular colored pigment such as carbon black, iron oxide, or a basic dye) in an amount of 20 to 35 wt. % (specifically 30 to 35 wt. %) of the composition.

The mat surface can be given onto the hot melt ink layer by forming a hot melt ink layer comprising a mixture of two kinds of resins (one is soluble in a specific solvent and another is insoluble in the solvent) and treating the ink layer by the solvent to remove the soluble resin resulting in a porous layer. The mat surface can be formed utilizing a hot melt ink composition comprising a thermoplastic binder and a thermo setting resin such as an unsaturated polyester, epoxy resin, or urethane resin.

The hot melt ink composition employed for the formation of the bar code of the invention preferably is resistant to a developing solution, particularly an aqueous alkaline developing solution, which is employed for developing a photographic latent image on the roll film.

Accordingly, the hot melt ink composition comprising a wax component having a rate of penetration of less than 25 at 25° C. and a melting point of higher than 65° C., a resin component being compatible with the wax component, and a colorant. The wax component is preferably contained in the ink composition in an amount of 60 to 90 wt. %. More specifically, the light absorbing bars can be formed of a hot melt composition comprising a wax component having a rate of penetration of less than 25 at 25° C. and a melting point of higher than 65° C., an ethylene-vinyl acetate copolymer, a denatured aromatic terpene, and a colorant. The resin components comprising the ethylene-vinyl copolymer and denatured aromatic terpene are preferably contained in the ink composition in a total amount of 10 to 40 wt. %.

Preferred hot melt ink compositions for the formation of the bar code are described below ("part(s)" means "weight part(s)"):

| | | |
|---|---|---|
| (1) | Ethylene/vinyl acetate copolymer | 8 parts |
| | Denatured terpene resin | 8 parts |
| | paraffin wax | 10 parts |
| | Carnauba wax | 20 parts |
| | Microcrystalline wax | 10 parts |
| | Oxidized wax | 30 parts |
| | Softening agent | 5 parts |
| | Colorant | 9 parts |
| (2) | Ethylene/vinyl acetate copolymer | 6 parts |
| | Denatured terpene resin | 10 parts |
| | paraffin wax | 55 parts |
| | Carnauba wax | 10 parts |
| | Microcrystalline wax | 5 parts |
| | Softening agent | 5 parts |
| | Colorant | 9 parts |

-continued

| | | |
|---|---|---|
| (3) | Ethylene/vinyl acetate copolymer | 5 parts |
| | Denatured terpene resin | 5 parts |
| | paraffin wax | 30 parts |
| | Carnauba wax | 15 parts |
| | Microcrystalline wax | 10 parts |
| | Oxidized wax | 20 parts |
| | Softening agent | 5 parts |
| | Colorant | 10 parts |
| (4) | Ethylene/vinyl acetate copolymer | 15 parts |
| | Denatured terpene resin | 15 parts |
| | paraffin wax | 15 parts |
| | Carnauba wax | 10 parts |
| | Microcrystalline wax | 10 parts |
| | Oxidized wax | 20 parts |
| | Softening agent | 5 parts |
| | Colorant | 10 parts |
| (5) | Ethylene/vinyl acetate copolymer | 20 parts |
| | Rosin resin | 20 parts |
| | paraffin wax | 15 parts |
| | Carnauba wax | 10 parts |
| | Microcrystalline wax | 10 parts |
| | Oxidized wax | 10 parts |
| | Softening agent | 5 parts |
| | Colorant | 10 parts |

The hot melt ink composition layer formed on a transfer film is placed on a substrate sheet of the jointing tape and a thermal head is applied on the transfer film to thermally transfer the ink composition in the form of a bar code pattern onto the substrate sheet. The hot melt ink composition layer can be transferred onto the substrate sheet in the form of a bar code pattern by means of a laser beam.

The jointing tape having the so formed bar code is then placed on the edge line of the photographic roll film to cover the adjoining area of the photographic film and the light shielding backing paper or leader paper.

In a preferred feature of the photographic roll film of the invention, the jointing tape has in a position along the bar code a reference area for correcting a value detected on the bar code, the reference area showing a reflectance and a glossiness essentially equivalent to those of the light reflecting spaces.

Figure 3:
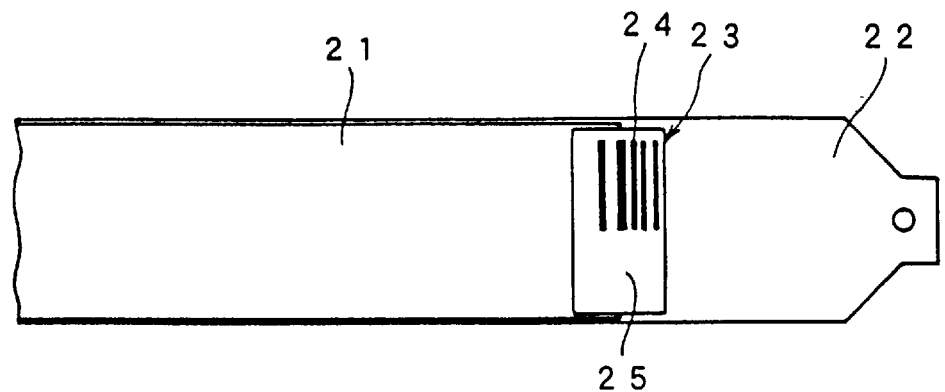
FIG. 3 illustrates a top plan view of another photographic roll film according to the invention.
Figure 4:
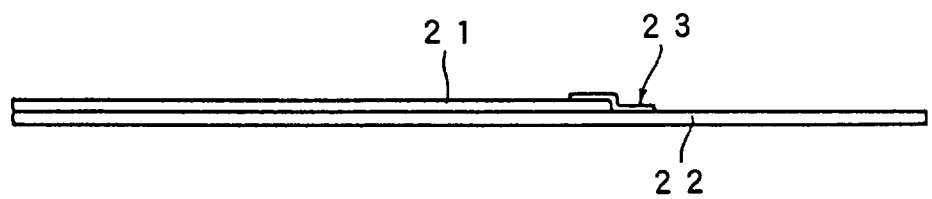
FIG. 4 illustrates a front view of the photographic roll film of FIG. 3.

FIGS. 3 and 4 illustrate the above-mentioned feature of the photographic roll film of the invention in which the roll film comprises a continuous film 21 and a light shielding backing paper 22. The film 21 and backing paper 22 are combined together by a jointing tape 23. On the jointing tape 23, a bar code 24 and a reference area 25 are formed. The reference area is formed on the surface of the jointing tape and gives a reference reflection for the light reflecting space.

Figure 5:
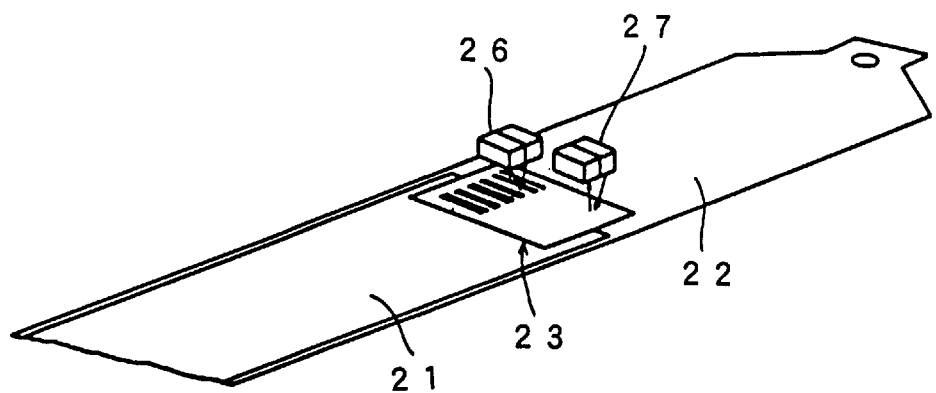
FIG. 5 illustrates a bar code reading system which is preferably employed in combination with the photographic roll film of FIG. 3.

FIG. 5 illustrates a bar code reading system employed for reading the bar code 24 of FIG. 3. Two photo-sensors (i.e., optical detector devices) 26, 27 are employed for simultaneously reading the bar code and the reference area. The collected optical data are used for obtaining accurately corrected bar code data after processing the data by a micro computer.

Figure 6:
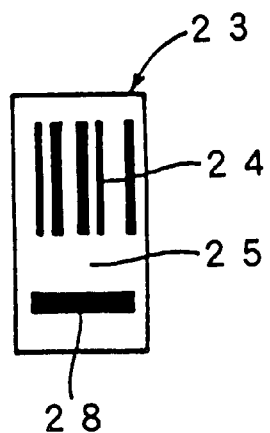
FIG. 6 illustrates a plan view of another jointing tape having a bar code and a reference area.

As is illustrated in FIG. 6, the jointing tape 23 can have in a position along the bar code 24 a reference area for correcting a value detected on the bar code, the reference area comprising a light absorbing area 28 and a light reflecting area 25 in which the light absorbing area 28 shows a reflectance and a glossiness essentially equivalent to those of the light absorbing bars 24 and the light reflecting area 25 shows a reflectance and a glossiness essentially equivalent to those of the light reflecting space.

Figure 7:
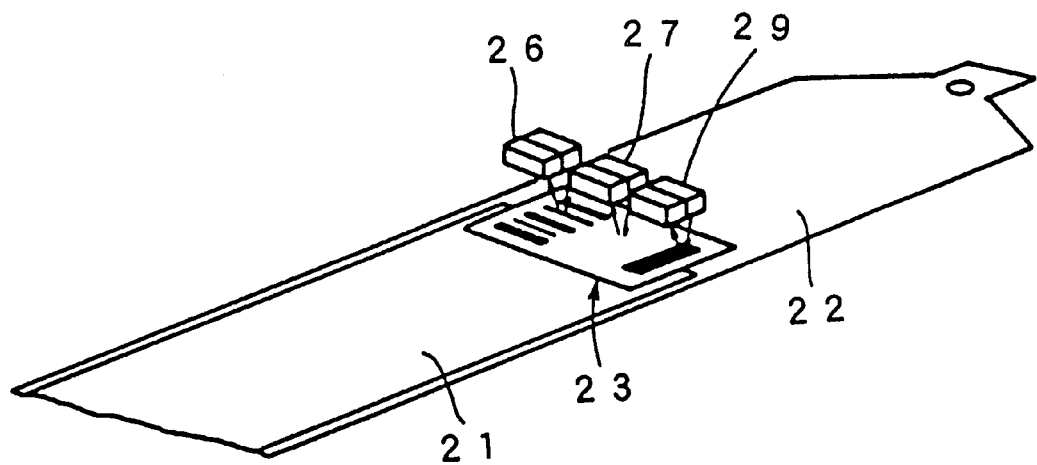
FIG. 7 illustrates a bar code reading system which is preferably employed in combination with the photographic roll film having a jointing tape of FIG. 6.

FIG. 7 illustrates a bar code reading system employed for reading the bar code 24 on the jointing tape 23 of FIG. 6.

Three photo-sensors (i.e., optical detector devices) 26, 27, 29 are employed for simultaneously reading the bar code and the reference area. The collected optical data are used for obtaining accurately corrected bar code data after processing the data by a micro computer.

Figure 8:
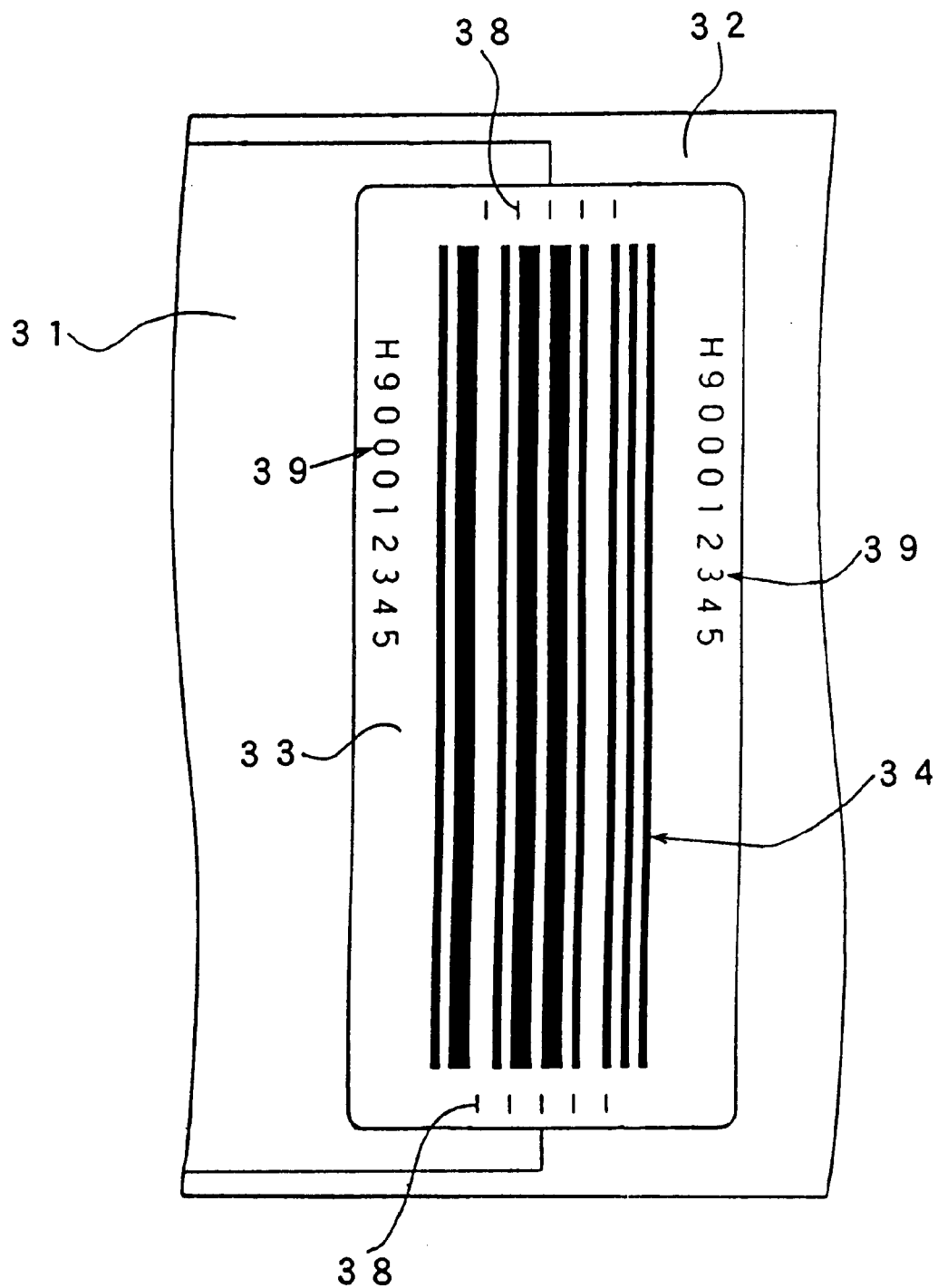
FIG. 8 illustrates a plan view of a further jointing tape having a plurality of slits on its both side and numbers specifically allotted to the roll film.

As described hereinbefore, the jointing tape is preferably produced by the use of a synthetic resin paper as a substrate sheet. The synthetic resin paper sheet is well resistant to deformation. The synthetic resin paper sheet, however, has a disadvantageous feature in which it is also resistant to rupture. After the photographic roll film is employed for placing a photographic latent image on the film, the roll film is developed using an aqueous alkaline developing solution. Before development, the roll film is generally separated from the backing paper or leader paper by rupturing the jointing tape in the direction traversing the roll film and along the edge line of the roll film. The rupture resistant synthetic resin paper sheet is troublesome in this respect. Accordingly, the jointing tape preferably has a plurality of slits on its one side or both sides, as is illustrated in FIG. 8. In FIG. 8, the jointing tape 33 is placed on the roll film 31 and the backing paper 32. The jointing tape has a bar code 34 on its surface. On the both sides of the jointing tape 33, a set of plural short slits 38 are formed for facilitating rupture of the jointing tape in the width direction traversing the roll film 31. The slits can be inclined on the plane of the tape, so that the jointing tape shows an appropriate resistance to rupture when the roll film is wound around the spool, but is easily rupturable when a shearing force is applied to the side of the tape. The means for facilitating the rupture of the jointing tape is not limited to the set of slits.

As is illustrated in FIG. 8, the jointing tape 33 preferably has a number 39 on its blank space. The number preferably is a number specifically allotted to the roll film, for instance, the serial number of the roll film. The corresponding number is generally printed on an adhesive tape for sealing a photographic roll film wound on a spool. The number of the adhesive tape can be observed in the wound condition. The number can contain other information.

Figure 9:
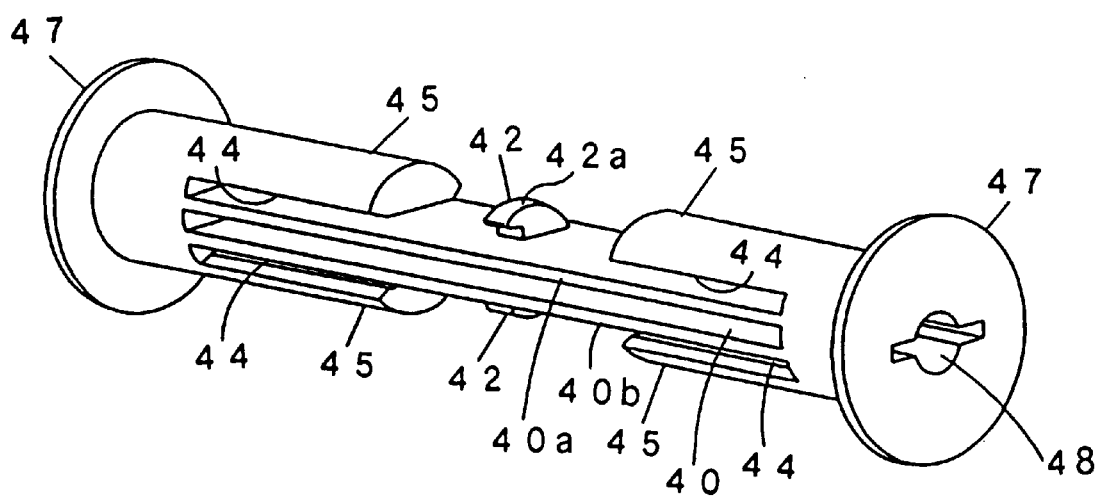
FIG. 9 is a perspective view of a spool which is favorably employed in combination with the photographic roll film of the invention.

The photographic roll film of the invention is preferably wound around a spool having a means which facilitates the engagement of the spool and the roll film. A preferred example of the spool is illustrated in FIG. 9. In FIG. 9, the spool has a center slit 40 in its cylinder body. The center slit 40 is formed between two supporting members 40a, 40b. The spool further has a flange 47 on both sides. At the center of the spool, a through hole 48 is formed. On each of the upper side and the under side of the spool, an engagement facilitating means comprising a hook 42, a pawl 42a, a holding slit 44, and a covering plate 45 is provided. The end of the light shielding backing paper which has an opening is passed through the center slit 40 and then is engaged with the engagement means by engaging the opening with a combination of hook 42 and pawl 42a. Both sides of the backing paper is placed in the holding slit 44 by pressing it by the covering plate 45.

Figure 10:
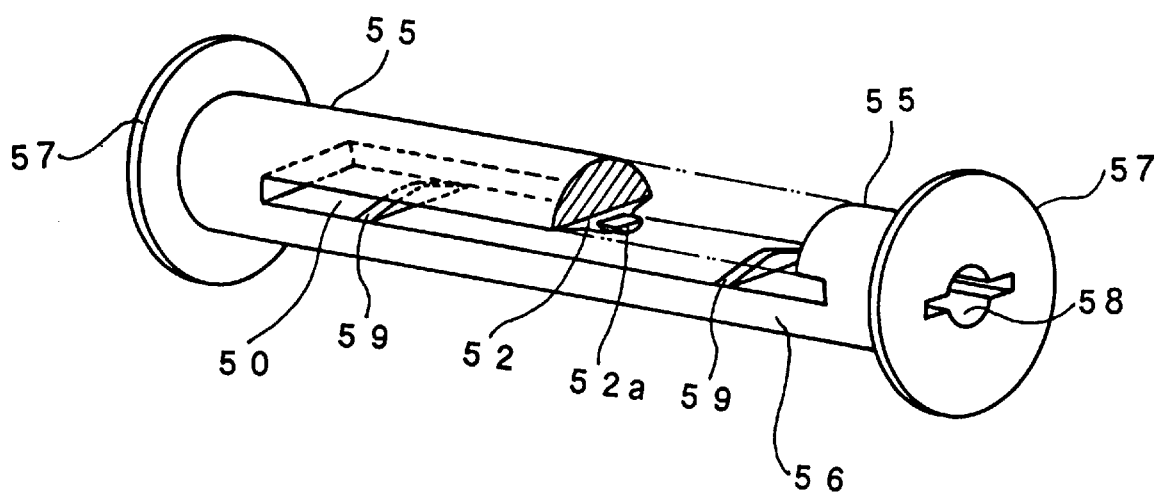
FIG. 10 is a partially cutaway perspective view of another spool which is also favorably employed in combination with the photographic roll film of the invention.

FIG. 10 illustrates another preferred spool for the use in combination with the photographic roll film. In FIG. 10, the spool comprises a center slit 50, a hook 52, a bar 52a, an covering plate 55, a supporting plate 56, a flange 57, a center through hole 58, and a pair of protruding means 59. The protruding means 59 has a curved top. The backing paper having an opening on the end is inserted into the center slit 50. In the center slit 50, the opening of the backing paper is engaged with the combination of hook 52 and bar 52a. The both sides of the backing paper are kept against the covering plate 55 by the protruding means 59. Accordingly, the backing paper is well fixed in the center slit 50 of the spool.

Figure 11:
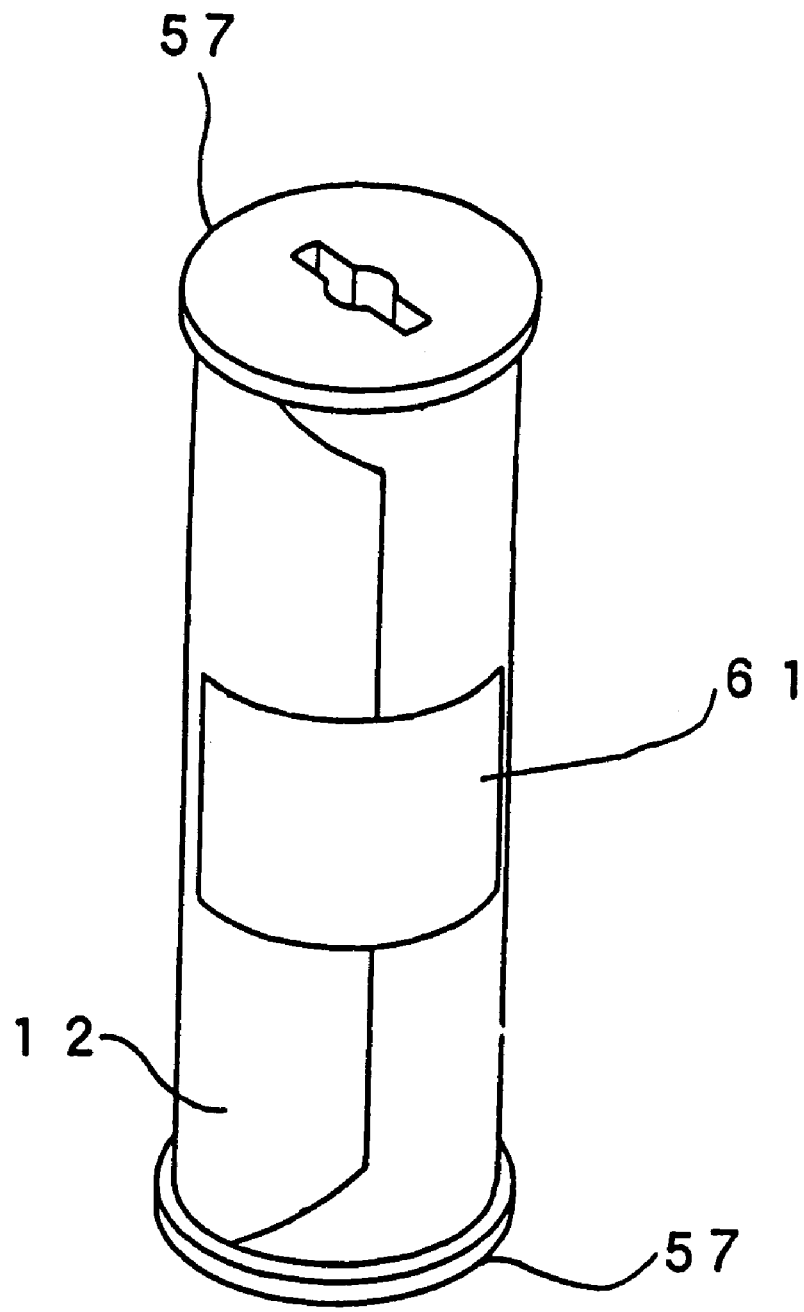
FIG. 11 is a perspective view of the photographic roll film of the invention which is wound around the spool of FIG. 10.

FIG. 11 gives an image of a photographic roll film of FIG. 1 is wound around a spool of FIG. 10. The numeral 61 is a shielding tape on which a serial number may be printed.

The present invention is further described by the following working examples.

EXAMPLES (1) Substrate Sheet of Jointing Tape

Substrate-A: A mixture of a soft wood pulp (20%) and a hardwood pulp (80%) which was digested by Kraft process, a paper strength increasing agent (cationated polyacrylamide), a sizing agent (rosin derivative), and a fixing agent (aluminum sulfate) were mixed to prepare a pulp slurry and the pulp slurry was processed on a Fourdrinier machine to give a wood free paper sheet (thickness: approximately 90 $\mu$m). The produced wood free paper sheet was named Substrate-A.

Substrate-B: On the Substrate-A, a light-reflecting layer (thickness: approximately 12 $\mu$m) was coated. The light-reflecting layer is formed using an emulsion comprising kaolin, calcium carbonate, titanium dioxide, polyvinyl alcohol, and a polyacrylic emulsion. The coated paper sheet was named Substrate-B.

Substrate-C: A commercially available cast coat paper sheet (Glossy paper, thickness: approximately 100 $\mu$m) was purchased to prepare Substrate-C.

Substrate-D: A commercially available polypropylene synthetic paper sheet (trade name: Yupo SGS 75, produced by Oji Yuka Co., Ltd.) to prepare Substrate-D.

Substrate-E: On the Substrate-D, a melt extruded polyethylene resin film (film thickness: approximately 12 $\mu$m) was laminated to prepare Substrate-E.

(2) Hot Melt Ink Ribbon

The following three ink ribbons were prepared for printing light absorbing bars of a bar code on respective substrates for the jointing tape.

Ink ribbon-a: On a polyester film (thickness: 3 $\mu$m), a solution of calcium laurate (mixture of mono-ester and di-ester) was coated and dried to form a stick preventive layer. On another surface of the film, a mixture of 3 weight parts of titanium dioxide (white carbon), 7 weight parts of a urea resin fine powder, 40 weight parts of ethylene-vinyl acetate copolymer, and 50 weight parts of toluene was coated and dried to form a matted subbing layer (thickness: 2 $\mu$m). On the matted subbing layer, an ink composition composed of 30 weight parts of carnauba wax, 35 weight parts of ester wax, 25 weight parts of carbon black, and 10 weight parts of oil was coated and dried to form a hot melt ink layer (thickness: approximately 2 $\mu$m). Thus, Ink ribbon-a was prepared.

Ink ribbon-b: The procedures for preparing the Ink ribbon-a were repeated except for using a mixture of 10 weight parts of titanium dioxide, 35 weight parts of ethylene-vinyl acetate copolymer, 5 weight parts of micro-crystalline wax, and 50 weight parts of toluene for the preparation of the matted subbing layer. Thus, Ink ribbon-b comprising the substrate, stick preventive layer, matted subbing layer, and hot melt ink layer was prepared.

Ink ribbon-c: The procedures for preparing the Ink ribbon-a were repeated except for not placing the matted subbing layer prior to the formation of the hot melt ink layer, to prepare Ink ribbon-c.

(3) Jointing Tape Provided with Bar Code

On the reverse surface of the substrate of jointing tape was coated an isoprene adhesive agent to form a pressure sensitive adhesive layer (thickness: 30 $\mu$m). On the front surface of the substrate was placed the hot melt ink layer of the ink ribbon, and the ink layer was transferred in the form of a bar code pattern onto the surface of the substrate using a heat transfer printer.

(4) Measurement of Light Reflection and Glossiness on the Surface of the Bar Code-printed Jointing Tape The light reflection on the substrate surface corresponding to the reflection on the light reflecting space and on the light absorbing ink-transferred area corresponding to the reflection on the light absorbing bar, as well as glossiness on each portion were measured using a monochromatic light (wavelength: 900±50 nm). The following apparatuses were employed for the measurements.

Light reflection: Spectrophotometer 330 (produced by Hitachi Ltd., $\phi$60 integrating sphere was employed, measured area: $\phi$ 20 mm)

Glossiness: Multiangle Glossmeter TC-108DPA (produced by Tokyo Denshoku Co., Ltd.; entrance angle: 60°)

(5) Examination of Bar Code Reading Error

The jointing tape having the bar code thereon was cut to give a specimen of 24 mm×58 mm. The specimen was placed and fixed on the jointing position at which a Brownie film and a light shielding backing paper were jointed. Thus prepared Brownie film of 220 type was wound around a spool and stored at 60° C. for 2 months.

After the storage was complete, the photographic film was released and just after the release of the film, the bar code on the jointing tape was repeatedly read (100 times) by means of a photo-sensor to examine frequency of occurring of reading error (reading could not done and erroneous data was detected).

The results of examination were marked according to the following criteria:

AA: no reading error was noted.

BB: bar code was not read once or twice.

CC: reading error was noted 3 to 5 times.

DD: reading error was noted 6 or more times. Remark: The reading error is not serious from the view point of practical use if the reading error did not frequently occur, because a manual input system is also provided to a camera.

(6) Results of Examination of Bar Code Reading Error

The results of the examination are set forth in the following Table 1.

TABLE 1

| Substrate | Ink ribbon | Reflection Space | Bar | Glossiness Space | Bar | Results |
|---|---|---|---|---|---|---|
| A | a | 65.5 | 4.3 | 3.1 | 8.2 | AA |
| A | b | 65.5 | 4.2 | 3.1 | 14.0 | AA |
| A | c | 65.5 | 4.1 | 3.1 | 34.0 | CC |
| B | a | 80.3 | 5.3 | 15.1 | 8.0 | AA |
| B | b | 80.3 | 5.1 | 15.1 | 18.1 | AA |
| B | c | 80.3 | 6.2 | 15.1 | 36.5 | CC-DD |
| C | a | 74.5 | 5.1 | 77.3 | 9.2 | DD |
| C | b | 74.5 | 5.2 | 77.3 | 18.5 | DD |
| C | c | 74.5 | 5.3 | 77.3 | 43.0 | DD |
| D | a | 79.6 | 5.4 | 7.1 | 7.6 | AA |
| D | b | 79.6 | 5.7 | 7.1 | 17.5 | AA |
| D | c | 79.6 | 5.9 | 7.1 | 44.2 | CC |
| E | a | 58.5 | 4.6 | 33.4 | 9.0 | BB |
| E | b | 58.5 | 4.1 | 33.4 | 18.4 | CC |
| E | c | 58.5 | 3.4 | 33.4 | 39.9 | DD |

The examination results set forth in Table 1 apparently indicate that the jointing tapes having the optical characteristics which satisfy the conditions defined in the invention produce almost not reading error troubles.

What is claimed is:

1. A photographic roll film placed on one of a light-shielding backing paper and a light-shielding leader paper, said roll film having two ends and comprising:

a jointing tape which joins said roll film at either one of one end and at said two ends to either one of the backing paper and the leader paper, said jointing tape having two sides including a surface and an underside;

a bar code disposed on said surface of said jointing tape, said bar code including a plurality of light absorbing bars and light reflecting spaces; and means for assisting rupture of the tape when a shearing force is applied to the tape in a direction traversing the roll film, said rupture assisting means being disposed on at least one of said two sides of the jointing tape.

2. The photographic roll film of claim 1, wherein the rupture assisting means is placed on each of said two sides of the tape.

3. The photographic roll film of claim 1, wherein the rupture assisting means of the tape comprises two or more slits that extend in the direction traversing the roll film.

4. The photographic roll film of claim 1, wherein the rupture assisting means of the tape comprises two or more slits that are inclined, on a plane of the tape, from the direction traversing the roll film.

5. The photographic roll film of claim 1, wherein the jointing tape has on the surface of the jointing tape, a number for identifying said roll film in addition to the bar code.

6. The photographic roll film of claim 1, wherein the jointing tape comprises a substrate sheet of synthetic paper made of a synthetic resin.

7. The photographic roll film of claim 1, wherein the jointing tape comprises a substrate sheet having a surface smoothness of more than 500 sec.

* * * * *